United States Patent
Maksimov et al.

(10) Patent No.: US 6,714,770 B2
(45) Date of Patent: Mar. 30, 2004

(54) METHOD AND APPARATUS FOR PREVENTION OF THE CONCURRENCE OF MODES CONDITION DURING OPERATION OF ELECTRONIC DEVICE

(76) Inventors: Aleksander Maksimov, viale Italia 353, 19125, La Spezia (IT); Peter Novek, 20 Mozartstraat, 201P Antwerp (BE)

( * ) Notice: Subject to any disclaimer, the term of this patent is extended or adjusted under 35 U.S.C. 154(b) by 0 days.

(21) Appl. No.: 09/993,126

(22) Filed: Nov. 16, 2001

(65) Prior Publication Data

US 2003/0096584 A1 May 22, 2003

(51) Int. Cl.[7] .............................. H04B 1/04; H01Q 11/12
(52) U.S. Cl. ................. 455/114.1; 455/126; 455/343.2; 375/238
(58) Field of Search ................................. 455/110, 107, 455/108, 111, 115, 117, 118, 341, 300, 343.2, 114.1; 128/897; 375/238, 239, 252, 254, 243, 135, 133, 146, 140; 327/164; 331/78, 37; 330/10

(56) References Cited

U.S. PATENT DOCUMENTS

| | | | | |
|---|---|---|---|---|
| 4,038,603 A | * | 7/1977 | Bethards | 455/114.1 |
| 4,310,891 A | * | 1/1982 | Niki | 455/154.2 |
| 4,468,634 A | * | 8/1984 | Takagi et al. | 331/60 |
| 4,531,237 A | * | 7/1985 | Bar-on et al. | 455/343.2 |
| 5,103,462 A | * | 4/1992 | Elle et al. | 375/238 |
| 5,309,116 A | * | 5/1994 | Stone | 331/37 |
| 5,544,665 A | * | 8/1996 | Litovitz et al. | 128/897 |
| 5,758,268 A | * | 5/1998 | Murakami et al. | 455/114.1 |
| 5,760,646 A | * | 6/1998 | Belcher et al. | 330/149 |
| 5,832,373 A | * | 11/1998 | Nakanishi et al. | 455/126 |
| 5,893,026 A | * | 4/1999 | Kim | 455/114.1 |
| 6,215,367 B1 | * | 4/2001 | Blaud et al. | 331/105 |
| 6,504,878 B1 | * | 1/2003 | Sparano | 375/297 |

* cited by examiner

Primary Examiner—Erika Gary
Assistant Examiner—Kamran Afshar
(74) Attorney, Agent, or Firm—Akerman Senterfitt

(57) ABSTRACT

A method for suppressing electronic equipment operation in the concurrence of modes condition, the equipment having at least one amplification device, includes the step of applying a random modulating signal to at least one node of the amplification device, wherein a transfer ratio or transfer function of the amplification device is modulated. An electronic apparatus adapted to suppress operation in the concurrence of modes condition, the apparatus having at least one amplifier, includes a structure for generating a sequence of random numbers, a device for converting the sequence of random numbers into a random modulating signal, and a structure for applying the random modulating signal to the amplifier, wherein a transfer ratio or transfer function of the amplifier is modulated. The electronic apparatus can include a cellular phone.

21 Claims, 9 Drawing Sheets

METHOD AND APPARATUS FOR PREVENTION OF THE CONCURRENCE OF MODES CONDITION DURING OPERATION OF ELECTRONIC DEVICE

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The invention relates to methods and apparatus for preventing the excitation of chemical bonding electrons during operation of electronic devices.

BACKGROUND OF THE INVENTION

When individuals communicate using mobile phones, voice signals are encoded and transmitted from an antenna as radio frequency radiation (RFR) at frequencies generally between approximately 800 MHz and 2 GHz. This is a frequency range near the middle of microwave range. It now appears that exposure to this microwave RFR may have serious health consequences.

Researchers have noted evidence of genetic damage in human blood and excessive mortality from brain cancers among wireless phone users. In addition, evidence has been shown of a statistically significant higher risk of neuroepithelial tumors. Although some manufacturers of mobile phones have funded extensive research programs to explore possible health effects associated with the use of mobile phones which have concluded that radio products that meet established guidelines pose no known health risk, evidence has become overwhelming conclusive linking the use of mobile phones to adverse health effects.

It is still unclear exactly how RFR exposure and cancer may be linked. When an individual transmits communication data over a mobile phone, approximately 40 percent of the radiated energy is absorbed by the head and hand of the individual. The level of radiation absorbed is not enough to produce significant heating to the human head. However, DNA may be easily damaged by RFR. Some have suggested a link between low-intensity microwave radiation and DNA damage in rat brain cells. Others have suggested that RFR may not damage DNA but may somehow hinder the ability of DNA to repair itself when it is damaged by natural causes.

The operation of certain systems in the concurrence of modes condition is known in engineering and electronics, and is generally regarded as a random event [1]. Operation in the concurrence of modes condition usually refers to transient intervals which can occur in electronic and magnetic circuits having distributed parameters. For example, certain electronic amplification circuits, such as those commonly used in cellular phones can, at random times, behave as circuits having distributed parameters. In copending patent application Ser. No. 10/040,598 by the same inventors as the instant application [2], it is shown that the operation of electric or magnetic circuits in the concurrence of modes condition can lead to the emergence of integral characteristics of electromagnetic field vector potential ($\vec{A}$) having a specific component that can excite electrons involved in chemical bonds in molecules of matter. Since molecules of matter include those comprising humans and other animals, adverse health effects such as noted above from use of mobile phones as well as other electronic devices may be caused in substantial part by radiation emitted during operation of certain electronic devices while in the concurrence of modes condition.

SUMMARY OF THE INVENTION

The invention provides methods and apparatus for preventing the emergence of operation in the concurrence of modes conditions in various electronic devices, such as radio-frequency (RF) communications equipment, which can result in the emission of harmful radiation. During operation in the concurrence of modes condition, pulses of radiation emitted during energy transfer between respective concurrent modes can excite chemical bonds in surrounding molecules, such as the DNA of humans. As a result, the emission of radiation during the concurrence of mode operation can cause harmful health consequences, such as cancer.

A method for suppressing electronic equipment operation in the concurrence of modes condition, the equipment having at least one amplification device, includes the step of applying a random modulating signal to at least one node of the amplification device. As a result, the transfer ratio or transfer function of the amplification device is randomly modulated.

The modulating signal can be applied to a feedback circuit in the amplification device, the modulating signal varying the transfer ratio or transfer function of the feedback circuit. The modulating signal can be applied as negative or positive feedback. The modulation can include pulse-frequency modulation (PFM). In this embodiment, the PFM modulation signal can have a constant pulse duration ratio or have a constant pulse duration.

The applying step can include generating random numbers, representing the random numbers as a series of pulses and applying the pulses to at least one electronic switch. The method can further include the step of switching the connection of an impedance element within the feedback circuit.

An electronic apparatus is adapted to suppress operation in the concurrence of modes condition, the apparatus having at least one amplifier, and includes a structure for generating a sequence of random numbers, a device for converting the sequence of random numbers into a random modulating signal, and a structure for applying the random modulating signal to the amplifier. As a result of the application of the random modulating signal to the amplifier, the transfer ratio or transfer function of the amplifier is randomly modulated.

The random modulating signal can be a pulse frequency modulated signal. The PFM signal can have a constant pulse duration ratio or a constant pulse duration. The apparatus can include at least one electronic switch, wherein the random modulating signal is applied to the switch. The amplifier can include a feedback circuit having at least one switch and at least one impedance element controlled by the switch. In this embodiment, application of the modulating signal to the switch controls connection of the switchable impedance element across at least one node of the amplifier.

A hand held communications device is adapted to suppress operation in the concurrence of modes condition. The communications device includes at least one amplifier, a structure for generating a sequence of random numbers, a device for converting the sequence of random numbers into a random modulating signal, and a structure for applying the random modulating signal to the amplifier. Application of the random modulating signal to the amplifier randomly modulates the transfer ratio or transfer function of the amplifier. The modulating signal can be a pulse frequency modulated signal and have a constant pulse duration ratio or a constant pulse duration.

The amplifier can include a feedback circuit having at least one switch and at least one impedance element controlled by the switch, wherein application of the modulating signal to the switch controls connection of the switchable impedance element across at least one node of the amplifier. The communications device can be a cellular phone.

BRIEF DESCRIPTION OF THE DRAWINGS

A fuller understanding of the present invention and the features and benefits thereof will be accompanied upon review of the following detailed description together with the accompanying drawings, in which.

DETAILED DESCRIPTION OF THE PREFERRED EMBODIMENTS

Figure 1:
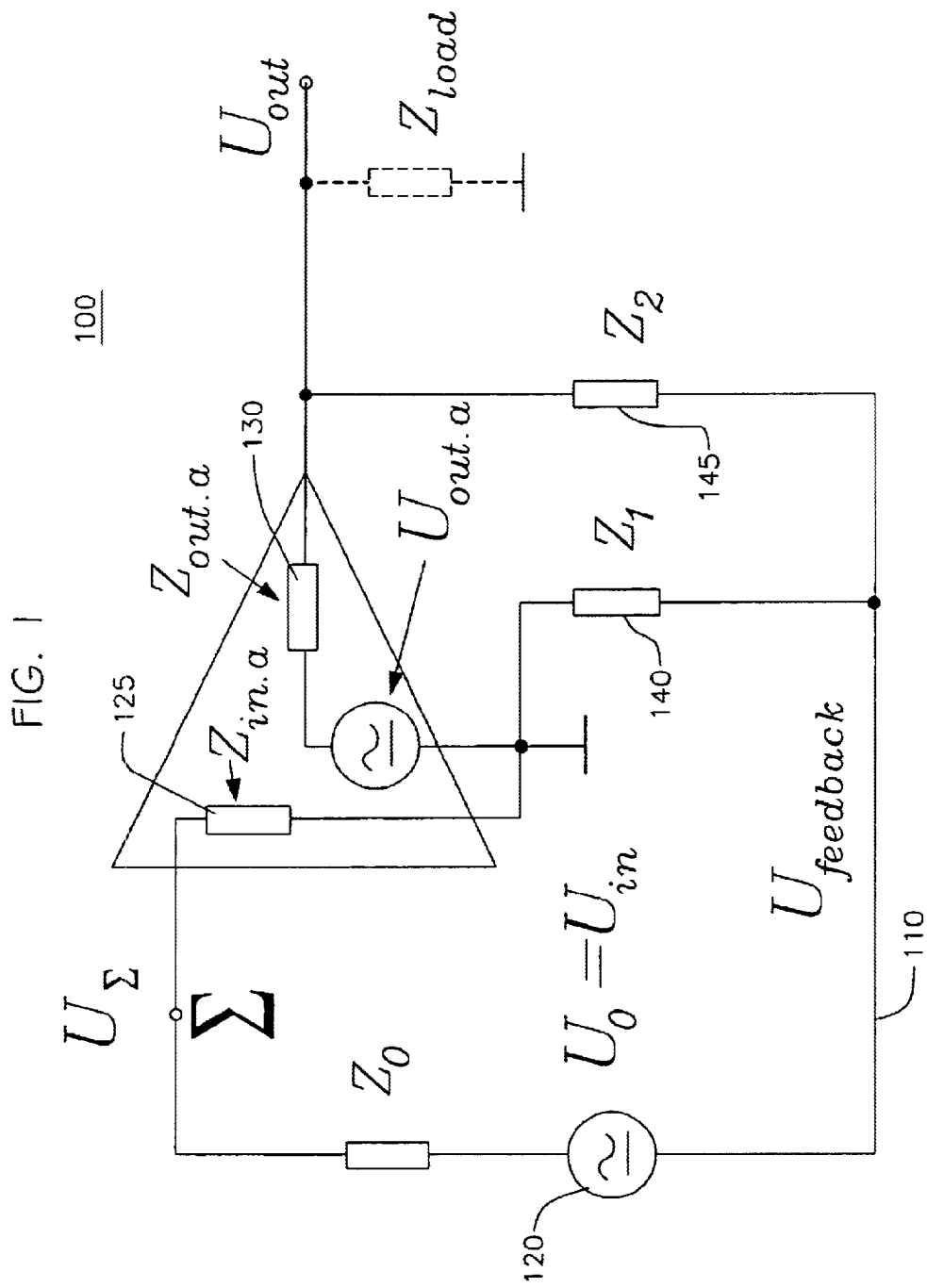
FIG. 1 illustrates an amplifier having consecutive feedback.

Under certain conditions, vector potential ($\vec{A}$) can result in emergence of the concurrence of modes condition during operation of certain devices, such as cellular phones, which can excite electrons involved in chemical bonds in molecules of matter. During operation in the concurrence of modes condition, pulses of radiation emitted during energy transfer between respective concurrent modes can excite chemical bonds in surrounding molecules, such as the DNA of humans. DNA is known to define many of the processes which occur in living organisms. As a result, the emission of radiation during the concurrence of mode operation can result in the excitation of chemical bonds in a human and other organisms which can cause pathological changes with possible harmful health consequences, such as cancer.

Although existing regulations which address the total power and strength of electric and magnetic components of electromagnetic fields produced by certain common electronic devices may provide some protection for people from ionization and thermal radiation effects, the prevention of chemical bond excitation in humans resulting from radiation emitted during electronic system operation in the concurrence of modes condition has not been disclosed or suggested.

In copending patent application No. 10/040,753 by the same inventors as the instant application, methods and apparatus are described which can be used to prevent, or at least substantially reduce, operation in the concurrence of modes condition of electrical power supply lines. One method of preventing the emergence of the concurrence of modes condition disclosed is by modifying conventional power supply lines by connecting variable (e.g. tunable) inductance elements in series between the sections of the wires (cables).

In application [3], a random number generator is disclosed for control the process of varying the values of the tunable inductances. Applied to power supply lines, that invention can produce power supply lines which are less harmful to people and the environment. In addition, transmission line loss of energy due resulting from the emergence of self-sustained oscillations of current and voltage in power supply lines can also be reduced.

Radio-frequency (RF) and microwave electronics, such as RF communications equipment includes electronic devices which can operate in the concurrence of modes condition during certain time intervals. This class of electronic devices and systems is broad and includes devices and systems which include one or more signal amplification elements, such as radar, radio stations, radiotelephones, mobile phones and cellular base stations and repeater stations.

The basic circuitry comprising the electronic devices noted above includes some common features. They each contain a power source, an amplifier and an antenna. Such devices are electronic circuits having distributed parameters in which the emergence of operation in the concurrence of modes condition is possible.

For useful circuits having at least one amplifier, the amplifier output is fed back to the input(s) through an impedance network. The impedance network sets a loop gain that is much smaller that the open-loop gain of the amplifier. Feedback is either positive or negative feedback. Positive feedback adds the feedback signal to the input signal while negative feedback subtracts the feedback signal from the input signal. Negative feedback stabilizes operation, while positive feedback generally destabilizes operation, sometimes resulting in oscillations. Accordingly, other than for the purpose of designing oscillators, amplifiers are generally provided negative feedback.

With regard to operational amplifiers having negative feedback, some simplifying assumptions are generally made. First, the output of the amplifier is assumed to be capable of doing whatever is necessary to keep the inputs at the same potential. Second, the inputs draw no current. This is equivalent to an assumption of infinite input impedance for both the inverting and non-inverting inputs.

In order to demonstrate the mechanism of emergence of operation in the concurrence of modes condition, it is helpful to consider the joint operation of a transmitter and receiver loaded on a common antenna. Assuming a lack of coupling between channels, in the signal path of the transmitter there exists a wave with the wave number $h_1$, and in the path of a receiver another wave with a wave number $h_2$.

In accordance with [4], weak coupling between the channels of the transmitter and receiver leads to oscillations of an anti-phase wave with the wave number $h_+$ and oscillations of the in-phase wave with the wave number $h_-$ rather than simple oscillations with wave numbers $h_1$ and $h_2$:

$$h_+ = \frac{h_1 + h_2}{2} + \sqrt{\left(\frac{h_1 - h_2}{2}\right)^2 + \eta h_1 h_2}$$

$$h_- = \frac{h_1 + h_2}{2} - \sqrt{\left(\frac{h_1 - h_2}{2}\right)^2 + \eta h_1 h_2}$$

Where η is a small positive value.

The presence of two waves with the wave numbers $h_+$ and $h_-$ in a system can lead to the occurrence of spatial beats. Spatial beats is a process where energy from the one signal path is transferred into another signal path. In the case of a weak coupling, electronic devices comprising a receiver and transmitter can become a resonator operating in the concurrence of modes condition. Weak coupling between the lines produces a small difference between the pairs of wave numbers $h_1$ and $h_2$ on one hand and wave numbers $h_+$ and $h_-$ on the other.

Some possible sources of coupling between the transmitter and receiver include the following:

1. Coupling of receiving and transmitting channels loaded on a common antenna.
2. Coupling of synchronization circuitry and automatic tuning circuitry of high frequency paths.
3. Coupling through control circuitry.
4. Coupling through the power supply circuits.
5. Coupling due to the parasitic capacitance and inductance between circuit elements.

The existence of a weak coupling due to any of above-mentioned coupling sources may lead to the emergence of operation in the concurrence of modes condition. In view of the above, it can be concluded that RF communications equipment can operate in the concurrence of modes condition.

It is known that sources of parasitic oscillations in radio-frequency (RF) communications equipment include fluctuation noise in the amplitude and phase of the current flowing in active elements of the signal path of the communications equipment [5]. Correspondingly, the oscillation modes produced can result in accumulation of phase and amplitude fluctuations. When the noise has a random character, the random variations of the phase of the fluctuations of the current and voltage can violate the phase balance of the parasitic oscillations. As a result, parasitic oscillation modes may not be formed. However, when noise has a quasi-periodical character, the balance of phase can be completed, and parasitic oscillation modes can be formed. This can lead to emergence of system operation in the concurrence of modes condition.

In the range of medium and high frequencies, such as more than 300 KHz, fluctuation noise is defined mainly by shot and thermal noise, which are known to have a random character [6]. However, conventional filters can generally be used to suppress these medium and high frequency components of noise.

At low frequencies, the main component of noise has an amplitude proportional to the value of 1/f ("1/f noise"), where f is frequency [6]. Other sources of noise, such as thermal noise, may be neglected due to the dominance of 1/f noise in the low frequency range. For microchip based circuits, 1/f noise is dominant at frequencies below 100 Hz [7]. In case of low-noise transistors, 1/f noise dominates below approximately 10 to 50 Hz [8]. It is generally difficult to eliminate low-frequency noise because its leads to low-frequency modulation of signals propagating in the various devices comprising the electronic equipment.

Various transformations of signals can occur during normal operation of electronic devices, such as communications equipment, which can result in random low-frequency noise being converted into quasi-periodic components. These quasi-periodic components can produce parasitic oscillation mode formation, which can lead to emergence of electronic device operation in the concurrence of modes condition.

An amplifier is a necessary circuit element for any transmitter and most practical receivers. For example, cellular telephones generally include a plurality of amplifiers. At least one amplifier is provided in both the transmit and receive signal paths. In the case of diversity circuitry, the receive path generally includes at least two amplifiers, at least one for each diversity path.

In a first approximation, the wave numbers of oscillating modes are functions of the transfer coefficient of the amplifier. Variation of the transfer coefficient can cause changes in initial conditions for parasitic oscillations.

Accordingly, random variation of the transfer coefficient of an amplifier can be used to violate the phase balance of parasitic oscillations. This can result in suppressing the formation of parasitic oscillation modes.

The variation of the amplifier transfer coefficient over the whole operating frequency range of the main low-frequency fluctuation in noise is desirable, low frequency noise "1/f" is normally in the range of 100 Hz or less. One method for suppressing operation in the concurrence of modes condition uses pulse-frequency modulation (PFM) of the transfer coefficient of the amplifier, where modulation is controlled by the generation and application of random or pseudo-random numbers. These numbers can be provided by a suitable number generator, such as a computer program. As used herein, the term "random number generator" is any structure, such as a software routine, that can generate random or pseudo-random numbers and the term "random number" includes pseudo-random numbers. Computer programs are likely to generate pseudo-random numbers, not actually random numbers.

Pulse frequency modulation is a form of modulation. In pulse frequency modulation, the pulse repetition rate, being defined as the number of pulses per unit time, is varied in accordance with some characteristic of the modulating signal.

FIG. 1 shows a simplified drawing of an amplifier 100 having consecutive feedback, where the feedback signal is a voltage $U_{feedback}$ 110 connected in series to the source 120 of the input signal $U_0=U_{in}$. [9]. The unloaded open loop voltage gain of the amplifier is equal to $K_U$ and is indicated by the triangle which represents the amplifier. The input impedance of the amplifier is shown as $z_{in\,a}$ 125 while the output impedance of the amplifier is shown as $z_{out\,a}$ 130 with $z_1$ and $Z_2$ being feedback impedances.

The voltage $U_{feedback}$ 110 is defined by the following expression based on the voltage divider rule:

$$U_{feedback} = U_{out} \frac{z_1}{z_1 + z_2}$$

The voltage $U_\Sigma$ at the amplifier summation point Σ is equal to:

$$U_\Sigma = -U_{out}/K$$

Since $U_\Sigma$ equals the sum of $U_{feedback}$ and $U_{in}$, the following equation results:

$$U_\Sigma = U_{out}\frac{z_1}{z_1+z_2} + U_{in}$$

The gain of the circuitry with feedback, $K_{feedback}$ is equal to:

$$K_{feedback} = \frac{U_{out}}{U_{in}} = -\frac{K_U}{1+\beta K_U}$$

Where $\beta=z_1/(z_1+z_2)$, $\beta$ being the transfer ratio of the feedback circuitry.

The multiplier $\beta K_U$ is the feedback coupling loop gain (loop amplification). When $\beta K_U \gg 1$, than the gain of the circuit shown in FIG. 1 can be written as follows:

$$K_{feedback} \approx -\frac{1}{\beta} = -\left(1+\frac{z_2}{z_1}\right)$$

In the case of amplifiers having consecutive feedback, a method for suppressing operation in the concurrence of modes can use PFM. The PFM can be controlled by a random number generator applied to modulate the transfer ratio $\beta$ of the feedback circuitry of the amplifier.

At least two types of pulse-frequency modulation can be used with this method. A first type of PFM comprises application of pulses of various duration, but having a constant pulse duration ratio. The pulse duration ratio (PDR), which is sometimes referred to as the relative pulse duration, can be defined as follows:

PDR=pulse period/pulse duration

For example, the PDR can be set equal to a constant (e.g. 2) with the pulse period and pulse duration both being a function of the value of each random number. A second type of modulation comprises variation of pulse duration as a function of the random number, while the pulse duration can be held constant. Either method can produce random in variation in the frequency of the train of pulses (PFM).

Figure 2:
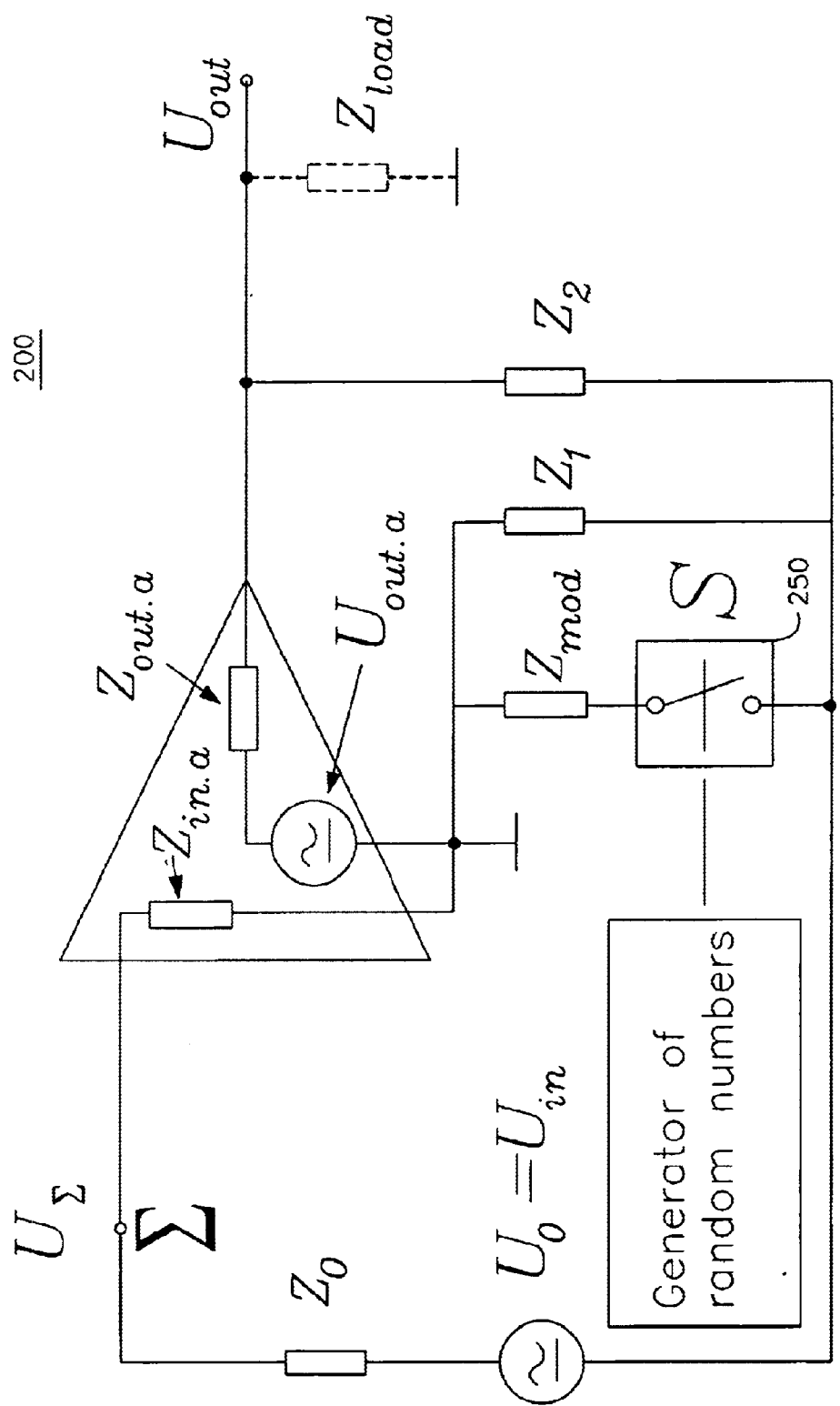
FIG. 2 illustrates a modification of the amplifier shown in FIG. 1, according to an embodiment of the invention.
Figure 3:
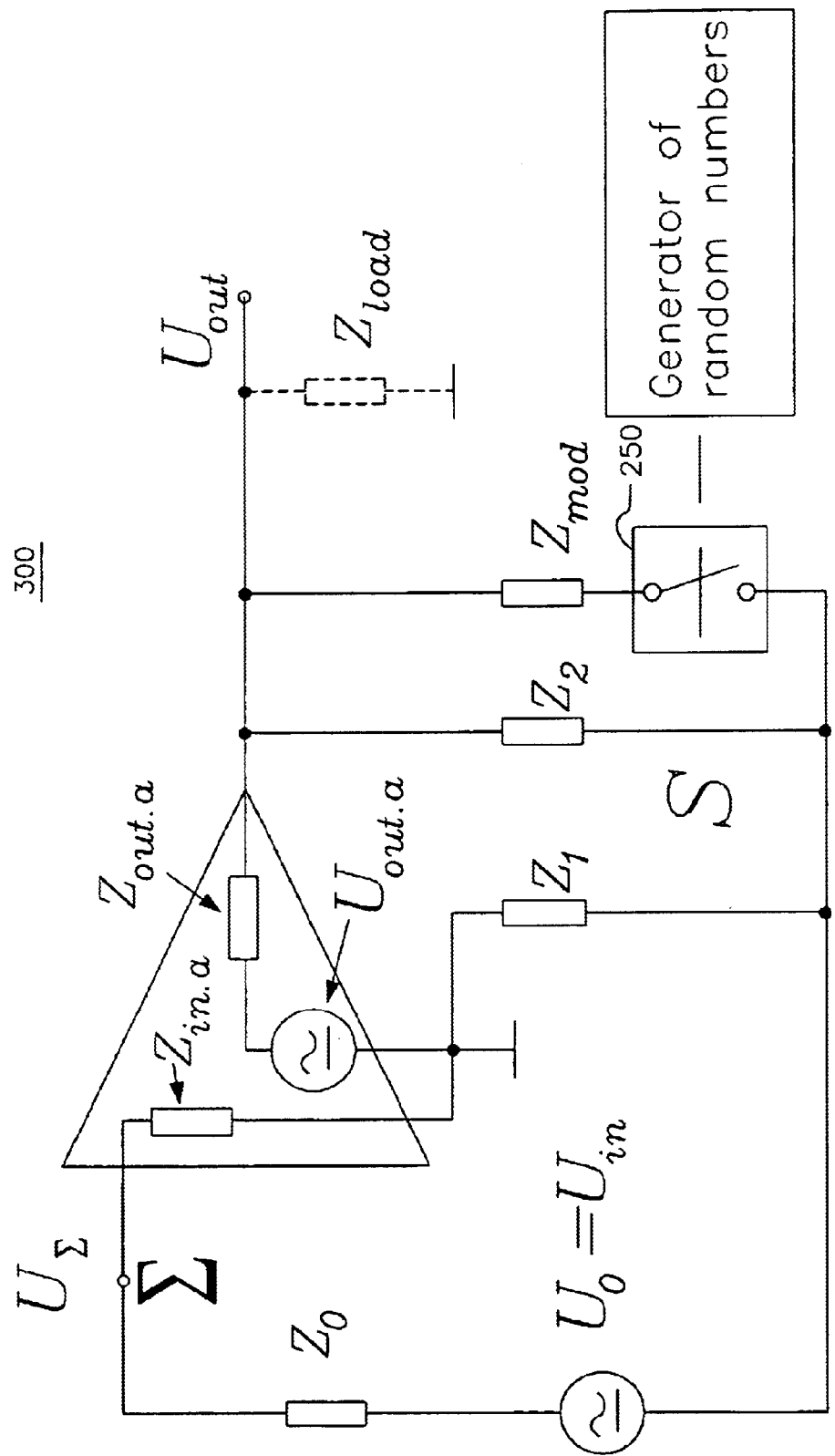
FIG. 3 illustrates another modification of the amplifier shown in FIG. 1, according to another embodiment of the invention.

Random pulses or other random alternating signals, for example a random sequence of the wave packets can be used to open and close a switch, such as electronic switch S 250, which can switch on additional impedance $z_{mod}$ parallel to $z_1$ for amplifier 200 shown in FIG. 2, or in parallel to $z_2$ for amplifier 300 shown in FIG. 3. The impedance elements can be passive (e.g. resistors) or active (e.g. transistors), and be either linear or non-linear. In the case that one or more impedance are non-linear elements, it is proper to speak of the transfer ratio of the feedback network as being a transfer function. Regardless of the choice of impedance elements, including one or more switched elements, random switching can result in random variation of the transfer coefficient of the amplifier. Such a variation can result in violation of the phase balance of parasitic oscillations. This can result in suppressing the formation of parasitic oscillation modes and the desired suppression of operation of the electronic system in the concurrence of mode condition.

Figure 4:
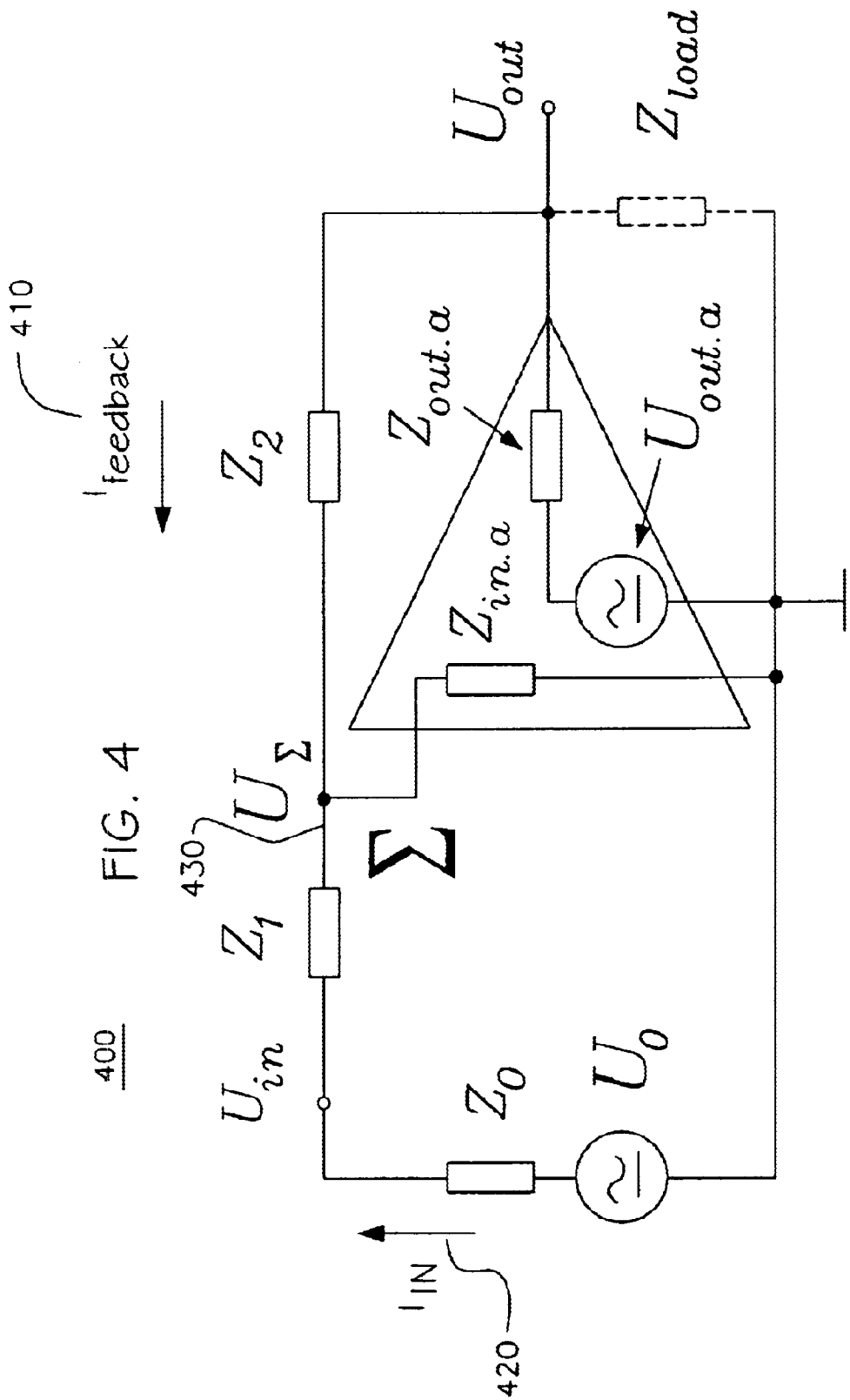
FIG. 4 illustrates an amplifier having parallel feedback.

FIG. 4 shows the schematic of an amplifier 400 having parallel feedback, where the feedback signal is a current, $I_{feedback}$, 410 is subject to the algebraic summation with the input current $I_{in}$ 420 at $U_\Sigma$ 430 [9]. If the feedback signal 410 adds to the input signal 420 the feedback is termed positive feedback, while if the feedback signal subtracts from the input signal the feedback is termed negative feedback. The invention is applicable to both types of feedback.

The unloaded open circuit voltage gain of the amplifier is $K_U$ and is shown by the triangle shown in FIG. 4. The input impedance of the amplifier is shown as $z_{in\_a}$, and output impedance of the amplifier is shown as $z_{out\_a}$.

The feedback current $I_{feedback}$ 410 is defined as follows:

$$I_{feedback} = \frac{U_{out}-U_\Sigma}{z_2}$$

The input current $I_{in}$ 420 is defined by the expression:

$$I_{in} = \frac{U_{out}-U_\Sigma}{z_1}$$

The voltage $U_\Sigma$ at the summation point $\Sigma$ is equal to:

$$U_{93} = -U_{out}/K_U$$

The gain of the circuitry with the parallel feedback, $K_{feedback}$, is equal to:

$$K_{feedback} = -\frac{K_U}{1+\beta K_U}\left(\frac{z_2}{z_1+z_2}\right)$$

Where $\beta=z_1/(z_1+z_2)$ is the transfer ratio of the feedback circuit.

When $\beta K_U \gg 1$, than the gain of the circuitry with the parallel feedback can be expressed in the following form:

$$K_{feedback} \approx -\frac{1}{\beta}\left(\frac{z_2}{z_1+z_2}\right) = -\frac{z_2}{z_1}$$

For amplifiers having parallel feedback, the method of suppression of an operation in the concurrence of modes conditions can be analogous to the method for suppressing the same for a circuit having consecutive feedback. The PFM modulation can be controlled by a generator of random numbers which is applied, preferably through use of a switch, to modulate the transfer ratio $\beta$ of the feedback circuitry of the amplifier.

Figure 5:
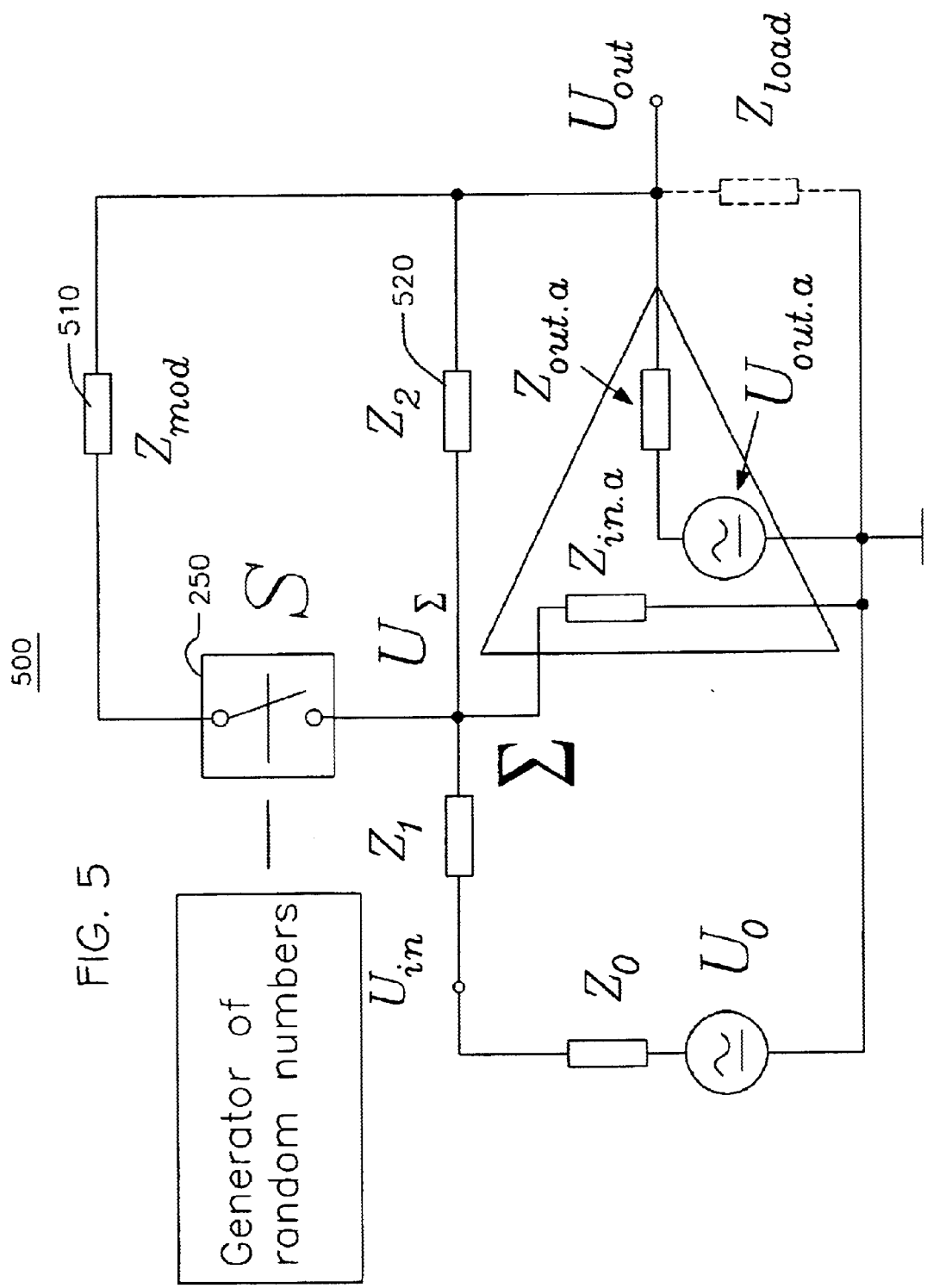
FIG. 5 illustrates a modification of the amplifier shown in FIG. 4, according to an embodiment of the invention.
Figure 6:
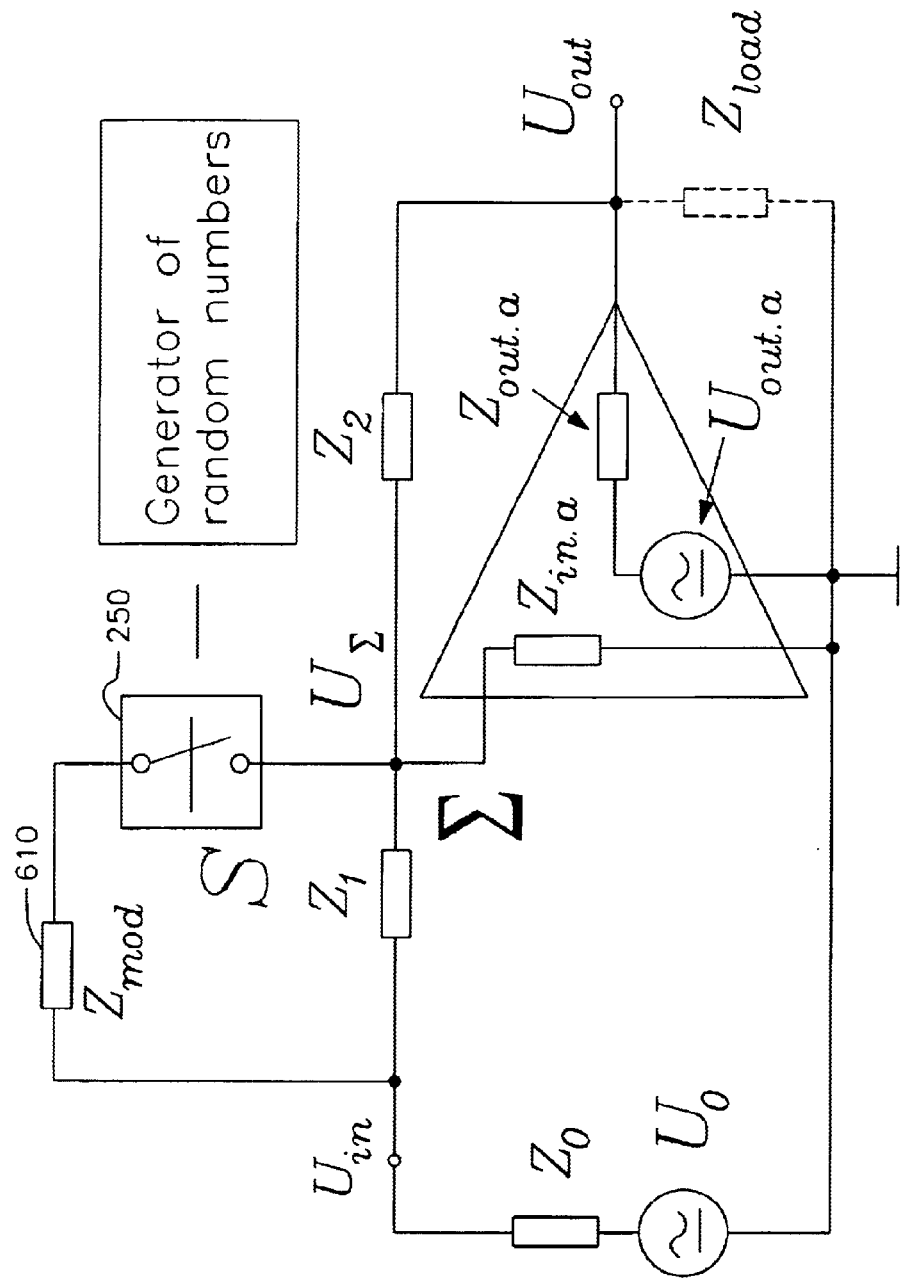
FIG. 6 illustrates another modification of the amplifier shown in FIG. 4, according to another embodiment of the invention.

Random pulses, or other random alternating signals, can be used to periodically open and close a switch, such as electronic switch S 250, which can switch on and off one or more additional impedance elements, such as $z_{mod}$ in parallel to $z_2$ 520 in the amplifier 500 shown in FIG. 5, or in parallel to $z_1$ 620 in the amplifier 600 shown in FIG. 6. Switching the additional impedance in and out of the feedback circuit can produce a corresponding variation in the transfer ratio of the feedback circuitry of the amplifier. Such a variation can result in violation of the phase balance of parasitic oscillations. This can result in suppressing the formation of parasitic oscillation modes and suppression of operation in the concurrence of modes.

Modulation depth should generally be selected mindful of the stability of the amplifier and the permitted signal distortion specified for the amplifier. Appropriate selection of modulation depth ensures that the invention does not significantly affect performance of the amplifier and the associated system as a whole. A nominal transfer ratio variation resulting from the modulation is generally from 0.5 to 5%. The frequency of modulation is generally selected in the normal range of 1/f noise, typically being in the range from approximately 10 Hz to approximately 100 Hz.

EXAMPLE

Figure 7:
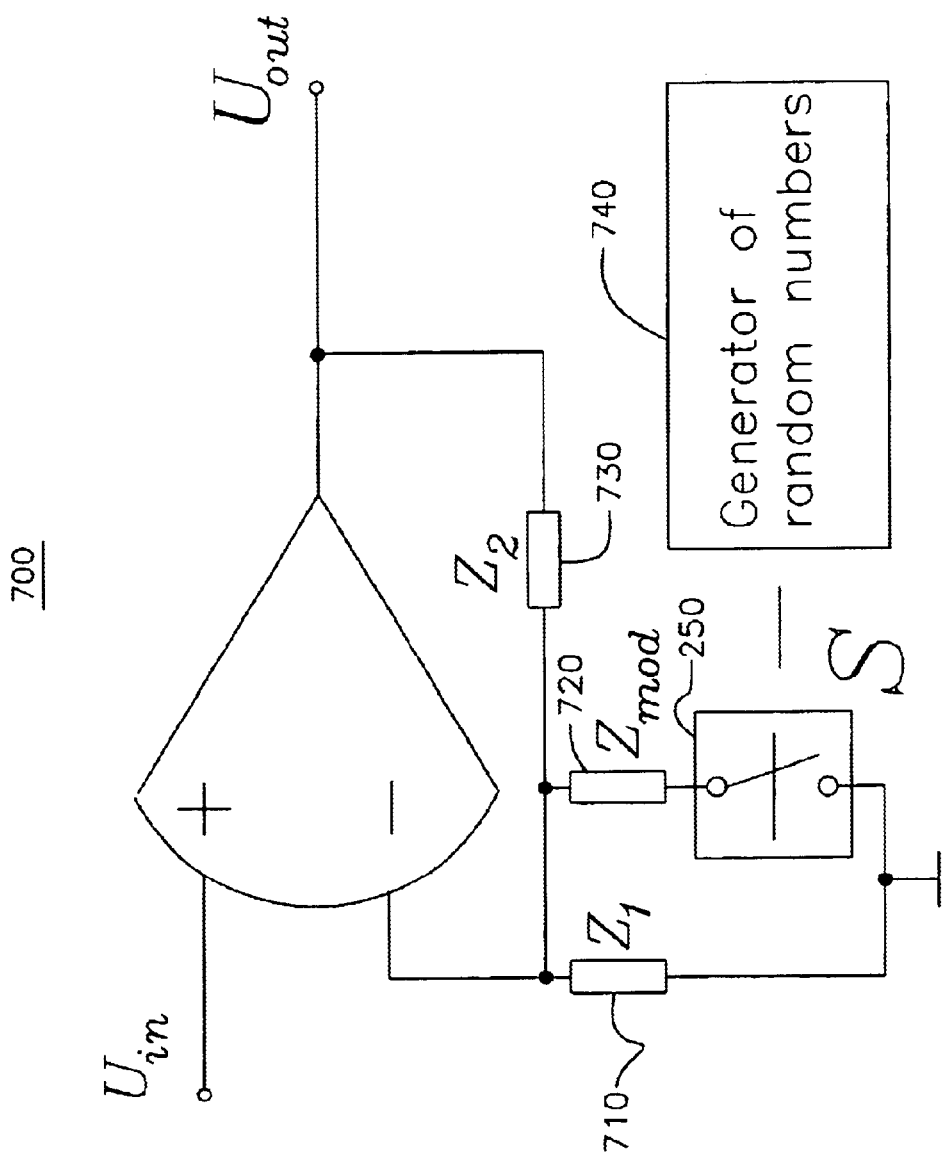
FIG. 7 illustrates connection of a random number generator to an operational amplifier, according to an embodiment of the invention.

FIG. 7 shows PFM of the transfer ratio of the feedback circuit of an operational amplifier 700. The inverting input of the amplifier is connected through a switch S 250, which is preferably an electronic switch S, and in parallel to the impedance $z_1$ 710. When switch S 250 is closed, impedance $z_{mod}$ 720 is added in parallel to $z_1$ 710. A generator of random numbers 740 controls the dynamic operation of switch S 250.

The gain of the amplifier is defined by the impedances $z_1$ 710, $z_2$ 730 and $z_{mod}$ 720.

When switch S 250 is open, the gain of the amplifier is equal to:

$$\text{Gain} = 1 + \frac{z_2}{z_1}$$

When switch S is closed, the gain of the amplifier is equal to:

$$\text{Gain} = 1 + \frac{z_2(z_1 + z_{mod})}{z_1 z_{mod}}$$

For example, if $z_2 = z_{mod} = 10$ k$\Omega$ and $z_1 = 100$ $\Omega$, when switch S is open, the closed loop gain of the amplifier is equal to 101. When switch S is closed, the gain of the amplifier becomes 102.

Pulse-frequency modulation (PFM) of the transfer ratio or transfer function of feedback circuitry can be realized at least two distinct ways. Both methods vary the pulse repetition frequency of the pulses which are applied to switch S.

Figure 8:
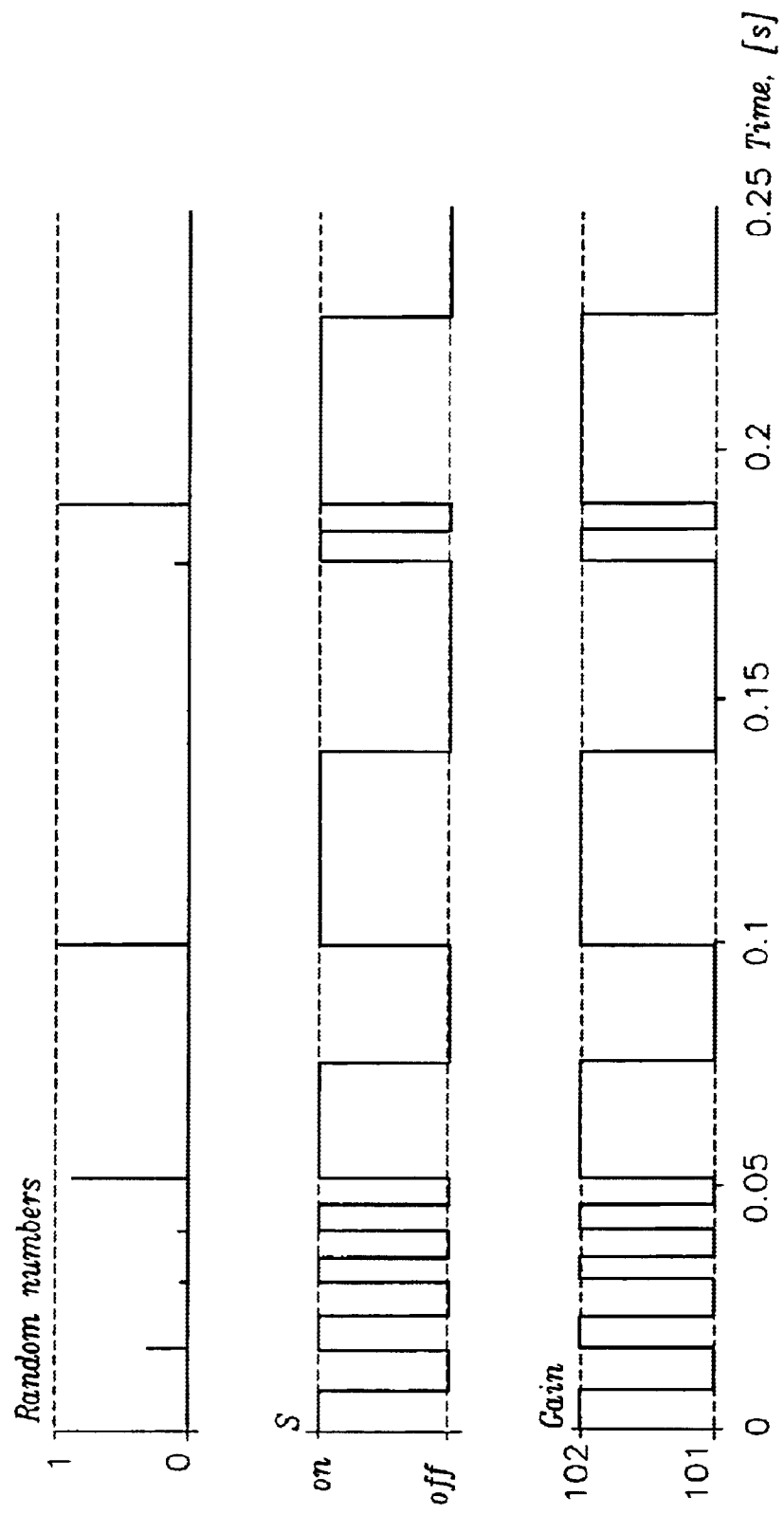
FIG. 8 is a diagram showing pulse-frequency modulation of the transfer ratio of a feedback circuit using a first method, according to an embodiment of the invention.

In a first method, a generator of random numbers produces a sequence of random numbers. Each random number corresponds a pulse of a certain duration. As shown in FIG. 8, larger random numbers have correspondingly longer pulse durations. The respective pulses shown have a constant pulse duration ratio of 2. However, the value of the pulse duration ratio can be other than 2. For example, 2.1, 2.3, 2.24, 2.5, 2.6 or 3.

The random pulses periodically open and close electronic switch S. As a result, the gain of the amplifier is randomly varied between a gain of 101 and 102 as shown in FIG. 8. This modulation corresponds to a modulation depth value of approximately 1%.

Figure 9:
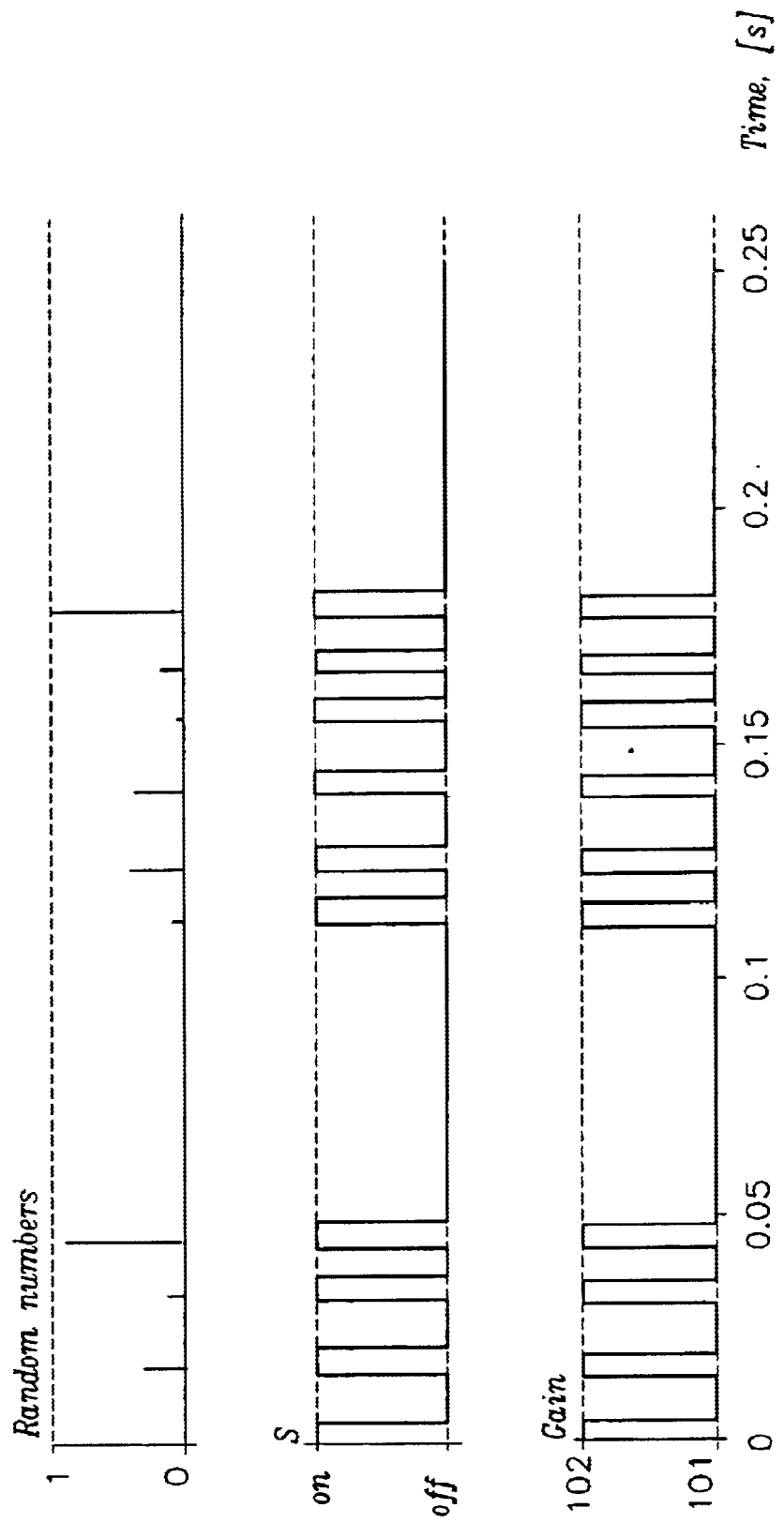
FIG. 9 is another diagram showing pulse-frequency modulation of the transfer ratio of a feedback circuitry using a second method, according to another embodiment of the invention.

In a second method, a generator of the random numbers again provides a stream of random numbers which are applied to an electronic switch which changes a transfer ratio of a feedback network provided across an amplifier. Each random number value corresponds a certain pulse duration. As shown in FIG. 9, larger values of random numbers correspond to longer pulse durations. Although not shown, larger values of random numbers could correspond to shorter pulse durations and smaller random number values to longer pulse durations, or other relationship, provided pulses having random pulse frequencies result.

The pulses periodically open and close the electronic switch S. As a result, the transfer ratio of the amplifier is varied between the values of gain of 101 and 102. This case also corresponds to a depth of the pulse-frequency modulation of approximately 1%.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

The following literature citations as well as those cited above are incorporated in pertinent part by reference herein for the reasons cited in the above text:

1. L. A. Bessonov, Theoretical basics of electrical engineering. Electric circuits: Textbook. 10th edition, Moscow, Gardariki, 2000, 638 p.
2. patent application No. 10/040,598 filed on Nov. 9, 2001 by A. Maksimov, P. Novak, entitled "Method and apparatus for excitation of chemical bonds."
3. patent application No. 10/040,753 filed on Nov. 9, 2001 by A. Maksimov, P. Novak, entitled "Current conducting part of power transmission line."
4. L. A. Vainstein, Electromagnetic waves, 2d edition, Moscow, Radio I Sviaz, 1988, 440p.
5. Physical Encyclopedic Dictionary, Chief Ed. A. M. Prokhorov, Moscow, Soviet Encyclopedia, 1983, 928p.
6. A. Van Der Ziel, Noise (Sources, Description, Measurements), editor, A. K. Naryshkin, Moscow, "Soviet Radio", 1973, 228p.
7. V. Zhalud, V. N. Kuleshov, Noises in semiconductor devices, Joint Soviet-Chech. Edition, Moscow, "Soviet Radio", 1977, 416p.
8. V. E. Yamnyi, Research of the flicker noise in the high frequency transistors. Proceedings of the Leningrad Polytechnic Institute, number 290, 1967, p.p. 62–64
9. M. V. Galperin, Practical circuitry technology in the industrial automatics. Moscow, Energoatomizdat, 1987, 320p.

We claim:

1. A method for suppressing electronic equipment operation in the concurrence of modes condition, said equipment having at least one amplification device, said method comprising the steps of:

generating random numbers;
representing said random numbers as a series of pulses, and applying a random modulating signal comprising said series of pulses to at least one node of said amplification device, wherein a transfer ratio or transfer function of said amplification device is randomly modulated to suppress said electronic equipment from operating in the concurrence of modes condition.

2. The method of claim 1, wherein said series of pulses is applied to a feedback circuit in said amplification device, said series of pulses varying a transfer ratio or transfer function of said feedback circuit.

3. The method of claim 2, wherein application of said series of pulses comprises negative feedback.

4. The method of claim 2, wherein application of said series of pulses comprises positive feedback.

5. The method of claim 1, wherein said series of pulses provides pulse-frequency modulation.

6. The method of claim 5, wherein said series of pulses has a constant pulse duration ratio.

7. The method of claim 5, wherein said series of pulses has a constant pulse duration.

8. The method of claim 1, wherein said amplification device further comprises a feedback circuit having at least one electronic switch, wherein said series of pulses are applied to said switch.

9. The method of claim 8, wherein said feedback circuit includes at least one impedance element controlled by said switch, further comprising the step of switching connection of said impedance element.

10. An electronic apparatus adapted to suppress operation in the concurrence of modes condition, said apparatus having at least one amplifier, comprising:

structure for generating a sequence of random numbers;

a device for converting said sequence of random numbers into a random modulating signal comprising a series of pulses, and structure for applying said random modulating signal comprising said series of pulses to said amplifier, wherein a transfer ratio or transfer function of said amplifier is randomly modulated to suppress said electronic equipment from operating in the concurrence of modes condition.

11. The apparatus of claim 10, wherein said series of pulses provides pulse frequency modulation.

12. The apparatus of claim 11, wherein said series of pulses has a constant pulse duration ratio.

13. The apparatus of claim 11, wherein said series of pulses has a constant pulse duration.

14. The apparatus of claim 10, further comprising at least one electronic switch, wherein said series of pulses is applied to said switch.

15. The apparatus of claim 10, wherein said amplifier further comprises a feedback circuit having at least one switch and at least one impedance element controlled by said switch, wherein application of said series of pulses to said switch controls connection of said switchable impedance element across at least one node of said amplifier.

16. A hand held communications device adapted to suppress operation in the concurrence of modes condition, said device having at least one amplifier, comprising:

structure for generating a sequence of random numbers;

a device for converting said sequence of random numbers into a random modulating signal comprising a series of pulses, and structure for applying said random modulating signal comprising said series of pulses to said amplifier, wherein a transfer ratio or transfer function of said amplifier is randomly modulated to suppress said electronic equipment from operating in the concurrence of modes condition.

17. The communications device of claim 16, wherein said series of pulses provides pulse frequency modulation.

18. The communications device of claim 17, wherein said series of pulses has a constant pulse duration ratio.

19. The communications device of claim 17, wherein said series of pulses has a constant pulse duration.

20. The communications device of claim 16, wherein said amplifier further comprises a feedback circuit having at least one switch and at least one impedance element controlled by said switch, wherein application of said series of pulses to said switch controls connection of said switchable impedance element across at least one node of said amplifier.

21. The communications device of claim 20, wherein said device comprises a cellular phone.

* * * * *